United States Patent Office 2,769,713
Patented Nov. 6, 1956

2,769,713

METHOD OF MAKING ASBESTOS PAPER CONTAINING A TACKY BONDING AGENT

Lucius H. Wilson, Riverside, Conn., assignor to American Cyanamid Company, New York, N. Y., a corporation of Maine No Drawing. Application March 27, 1953,
Serial No. 345,242

8 Claims. (Cl. 92—21)

This is a continuation-in-part of my copending application Serial No. 287,801, filed on May 14, 1952.

The present invention relates to the manufacture of felted asbestos products of improved strength, pliability, and elasticity from an aqueous suspension of asbestos fibers and an anionic dispersion or emulsion of a normally tacky hydrophobic organic bonding agent. More particularly, the present invention relates to a method for depositing a bonding agent in the condition described upon asbestos fibers in dilute aqueous suspension without thereby causing the fibers to form non sheetable aggregates or clots. The invention includes the step of forming paper from the thus treated asbestos fibers and drying the paper at an elevated temperature to develop the strengthening properties of the bonding agent.

Asbestos paper, when formed in the absence of a binder, is a weak, brittle, and almost friable product which cannot be used where even appreciable mechanical strength is necessary. In the past, asbestos paper has been strengthened by application thereto of an adhesive or tacky resinous bonding agent followed by calendering to unite the fibers as completely as possible with the bonding agent. By one method the paper has been impregnated with a solution of the bonding agent in a volatile solvent, and the solvent later stripped off, leaving the bonding agent in the paper. In accordance with another, the paper is impregnated with the bonding agent in hot, molten form. The first method is objectionable because of the difficulty of recovering the solvent, and in the latter process not all the fibers are bonded, as penetration of the molten resin around the fibrils is usually incomplete.

The invention is directed to a process for preparing strong, pliable and elastic asbestos paper by forming a dilute aqueous dispersion of papermaking asbestos fibers, adding a large amount of tacky bonding agent thereto in emulsified or latex form, precipitating the bonding agent on the fibers by interaction of the fibers and the latex, and sheeting and drying the fibers bearing the bonding agent.

Trials have demonstrated that when typical commercially available latices of tacky bonding agents are added to an aqueous stock of asbestos fibers in more than small amounts, the fibers almost instantly gather into larger aggregates or "clots." Formation of clots takes place within a few seconds. Once clots have formed, the fibers cannot be liberated by any practical means. Hence, a stock which has clotted cannot be formed into asbestos paper.

Trials have also demonstrated that very small amounts, up to 1%-2% and occasionally 3%-4% of typical commercially available latices of tacky bonding agents, based on the dry weight of the fibers, causes no clotting but only agglomeration of the fibers, that is, the arrangement of the fibers into loose intermeshed bundles which can be dispersed by a few minutes of ordinary beating. Paper containing less than 5% of bonding agent exhibits poor strength and elasticity. The addition of large amounts of bonding agent, that is, 5% or more, based on the weight of the fibers, causes clotting as stated. Because of these circumstances, so far as known it has not been found practical to manufacture strong, pliable and highly distensible asbestos paper by adding an anionic latex of a tacky bonding agent to a stock of ordinary asbestos fibers and then sheeting the fibers.

Typical bonding agents which are usually sufficiently tacky to cause clotting in this manner are the copolymers of butadiene and styrene, styrene and ethyl acrylate, butadiene and acrylonitrile, vinyl acetate and ethyl acrylate, and esters of acrylic acid and isobutylene. These include the polymers present in the commercially important synthetic rubber latices known as GR-S, Buna-N, Buna-S, Hycar, GR-N, Ameripol, and Hycar. Polymers which contain more than 50% butadiene or ethyl acrylate are very tacky and therefore particularly disadvantageous in this respect.

In general, the latices which are most frequently responsible for the formation of clots are those which, when dried on a glass plate at room temperature, yield films which are tacky to the touch. However, clotting frequently takes place with latices which contain a somewhat less tacky bonding agent.

The emulsifying agents used in their manufacture are usually fatty acid soaps such as sodium stearate, sodium palmitate, sodium oleate and sodium rosinate, these being very cheap yet highly effective emulsifying agents for this purpose. The aforementioned latices are alum-unstable, that is, they flocculate upon addition of 1% of alum based on their resin content. They are also acid-unstable, flocculating at pH values below roughly 5.

Certain types of these latices are also commercially available in acid-stable form. These latices are prepared by the use of acid-stable emulsifying agents such as the agents of the sulfoalkyl acid ester type, for example the sodium dialkylsulfosuccinates or the agents prepared by reacting a short chain alkylnaphthalenesulfonate with formaldehyde, in place of soap. Although such latices are stable to acid, they are unstable to alum in the same manner as the latices containing soap.

In general it has been found that any normally alum-unstable latex of a tacky organic bonding agent, that is, a latex of a tacky bonding agent prepared by the use of an alum-unstable emulsifying agent, causes severe clotting in the manufacture of bonded asbestos paper when more than about 5% is added based on the weight of the fibers. As a result, so far as is known, no commercially available latex of this type can be successfully used in large amounts in the manufacture of asbestos paper by the beater addition method.

The latices referred to are commonly prepared by forming a body of hot water containing one of the aforementioned emulsifying agents and if desired a polymerization catalyst and then slowly running in to this body of water with vigorous agitation the bonding agent in a low state of polymerization. Agitation is continued until the molecular weight of the bonding agent has increased to the desired extent. The latex is then cooled and a stabilizer added to permit storage of the product. When a soap is used as the emulsifying agent, as is typical, roughly 5% is used based on the weight of the polymeric material and the content of polymeric material in the latex as manufactured is 40%-70% by weight.

Latices of the type described are best prepared by the use of anionic emulsifying agents alone. Non-ionic emulsifying agents alone or in combination with an anionic agent are not advantageous as non-ionic agents are known to inhibit polymerization of the bonding agent. Cationic agents are not advantageous as latices prepared by the use of cationic agents flocculate poorly if at all in the presence of asbestos fibers.

The discovery has now been made that a normally alum-unstable anionic latex of a tacky bonding agent may be modified so as to permit its addition to asbestos fibers in aqueous suspension in large amounts without causing the fibers to clot. It has been found that when such a latex is modified by adding thereto sufficient of a stabilizing mixture of a non-ionic dispersing agent and an anionic dispersing agent selected from the group consisting of an alum-stable sulfate and the alum-stable sulfonate dispersing agents to render the latex alum-stable, from 5% up to as much as 50%–100% of bonding agent (based on the dry weight of the asbestos fibers) may be added without causing the fibers to arrange themselves in more than a loose state of agglomeration, from which state the fibers may be liberated by a few minutes of ordinary beating. A major proportion, that is, 50%–100% of the bonding agent added, is precipitated by this method on the fibers.

It has further been found that when flocculation of the thus modified latex on the fibers is incomplete, substantially complete flocculation is ensured by the presence of alum or equivalent aluminum salt. The alum may be added to the suspension of the fibers before the latex is added; or may be added to the suspension after the latex has been added, or may be dissolved in the latex and added in that manner. When sufficient alum is used, a clear white water results in a few minutes, indicating substantially complete flocculation of the emulsified bonding agent on the fibers.

The bonding agent is irreversibly flocculated or precipitated on the fibers, that is, the adhesion between the precipitated particles of bonding agent and the fibers is so strong that the bonding agent is not removed even when the fibers are subjected to normal beating. The same type of adhesion takes place regardless of the presence or absence of alum.

Once flocculation and dispersion of the impregnating agent upon the fibers has reached equilibrium, the fibers are sheeted by any conventional process. The water is allowed to drain, and surprisingly the rate of drainage is much faster than when no bonding agent is present. When thick sheets are prepared, drainage is facilitated by vacuum. Despite the normally tacky nature of the bonding agent, the sheets are readily removed from the wires and felts without sticking or tearing and then need be only air dried for development of a strong, pliable and elastic sheet. Strength is improved by calendering. A further improvement is effected by heating the sheets for ½ to 3 minutes above the flowing point of the bonding agent. The effect of this appears to cause the bonding agent to flow along and between the fibers, bonding them together more thoroughly than would otherwise be the case.

When alum is not used the drainage water may contain some undeposited latex. This water may be recirculated permitting this latex to be used subsequently.

Bonding agent in the amount of 50% of the dry weight of the fibers has been completely and irreversibly flocculated on the fibers in this manner without clotting.

The effect of the stabilizing mixture and the alum, where used, and the reason why clots do not form in the process of the present invention are not understood, and the invention should not be limited by any particular theory.

In addition to overcoming the problem of clotting, the process of the present invention has numerous distinct advantages. In the first place the latices, after modification, are extraordinarily stable. Latices of impregnating agents prepared by the use of a fatty acid soap as the sole or principal emulsifying agent are ordinarily flocculated by the addition of small amounts of acids or electrolytes. The stabilized emulsions referred to are acid-insensitive and fail to flocculate even when their pH is reduced to 2. Although stocks of asbestos fibers normally have an alkaline pH, this pH may become slightly acid, down to about pH 5, when alum is added to ensure complete flocculation of the impregnant as described. As a result of their great acid-stability the latices of the present invention, when added to acidic asbestos stocks, flocculate primarily on the surface of the fibers in the water, and not in the water through which the emulsified particles pass. The reason for this surprising behavior is not known.

Moreover, the stability of these latices permits them to be used in conjunction with anionic or non-ionic sizes for producing water-repellent asbestos paper, particularly with those sizes which are best applied on the acid side.

The manufacture of strong, pliable, and elastic asbestos paper according to the process of the present invention does not require that excessively large amounts of bonding agent be used. The reason for this appears to be that the particles of bonding agent are precipitated locally yet very uniformly on the surface of the fibers so that substantially all of the bonding agent exerts a maximum bonding effect with little waste. Maximum improvement in strength, per increment of bonding agent added, occurs when the fibers carry about 10% of bonding agent based on their weight. The precipitation of larger amounts of bonding agent can and does increase the strength of the sheet markedly beyond this point, but the improvement in strength effected by the addition of further increments of bonding agent tends to level off. On the other hand, elongation continues to improve as up to 20%–30% of bonding agent is added. Similarly as in the case of strength, the addition of more bonding agent causes an increase in elongation but at a reduced rate.

For certain applications, particularly gaskets, a full, plump, pliable, and leathery asbestos sheet is desired. To secure these properties much more of the bonding agent may be used and excellent sheets of this type are obtained when the weight of the impregnant is 30%–50% of the weight of the asbestos.

The manufacture of low conductivity asbestos paper of the type used for electrical insulation requires that the paper be free from adsorbed inorganic cations. According to the present invention strong, pliable, low-conductivity asbestos paper of electrical insulating grade can be manufactured by performing the above-described process in its embodiment which does not require the use of alum. In the absence of alum, substantially complete precipitation occurs when up to 15% of bonding agent is added, based on the weight of the fibers. This is sufficient to produce an asbestos paper which is acceptable for most electrical purposes.

More in detail, an aqueous suspension or stock of asbestos papermaking fibers is prepared in any conventional way. Normally the fibers are thoroughly slushed, and are beaten where necessary to shorten any excessively long fibers. Preferably the stock is then well brushed, this serving to increase the strength of the paper ultimately obtained. Ordinarily, the consistency of such stock is between at least about 0.5% and the consistency at which the stock becomes too viscous to be treated, generally 3%–5%.

The emulsion selected for use is modified by first adding thereto a stabilizing mixture consisting of a non-ionic dispersing agent and an alum-stable anionic dispersing agent of the sulfate or sulfonate type, the weight of the anionic agent being about 25% to 100% of the weight of the non-ionic agent. In certain instances, particularly when the emulsion is free from fatty acid soaps, the amount of anionic agent may be decreased. Where the emulsion contains fatty acid soap, as is almost always the case, best stabilization is obtained by the use of 45% of the anionic agent based on the weight of the non-ionic agent and this ratio is therefore preferred.

According to a preferred embodiment of the invention the latex selected for use is modified by first adding thereto a stabilizing mixture consisting of a non-ionic dispersing agent and an alum-stable anionic dispersing agent of the sulfate or sulfonate type, the weight of the anionic agent being about 25%–100% of the weight of the non-ionic agent. Too little of the anionic agent causes the latex to flocculate prematurely in the liquid phase of the stock, and more than the maximum amount recited yields no substantial benefit. Where the latex contains fatty acid soap, as is almost always the case, best stabilization is obtained by the use of about 45% of the anionic agent based on the weight of the non-ionic and this ratio is therefore preferred, this ratio minimizing the danger of clotting and ensuring that substantially none of the latex flocculates prematurely.

The amount of the stabilizing mixture which must be added to the latex depends on many variables, chief among which are the type and amount of soap or other emulsifying agent used in the preparation of the latex, the tackiness of impregnating agent in the latex, the effectiveness of the dispersing agents of which the stabilizing mixture is composed, and the strength of the positive charges on the asbestos fibers. As a result, no exact numerical ratio has been found for correlating the amount of stabilizing mixture necessary in each instance with the above-mentioned variables.

It has been found, however, that a correct amount can readily be ascertained by adding to the latex at least sufficient of the stabilizing mixture to stabilize the latex to alum. According to this method, a small amount of the stabilizing mixture is added to an aliquot of the latex diluted to about 20% solids with water, followed by the addition of 5% of alum as a dilute, for example, 3% aqueous solution thereof, the percentage of alum so added being based on the weight of elastomer or impregnant in the emulsion or dispersion. If flocculation of the latex occurs, the test is repeated upon a fresh aliquot of the latex using an increased amount of the stabilizing mixture.

The end point of the test occurs when the emulsion remains stable in the presence of 5% alum, based on the weight of the elastomer or impregnant in the emulsion.

The amount of alum which should be added to ensure complete flocculation of the latex is at least 1/6 mol of alum per mol of alum-sensitive dispersing agent therein. A large excess of alum over this amount may be added without harm, and this is preferred since it avoids the danger of adding too little. The emulsion is then ready for use.

Alternatively, the alum may be added to the stock before the latex is added, or after flocculation of the latex has reached equilibrium with substantially the same results.

Ordinarily, commercial latices are supplied at a solids content of 30%–60%. Since the process requires a uniform distribution of the latex throughout the fibrous stock, it is advantageous to dilute these latices to roughly 10%–20% bonding agent content with water before use.

Any non-ionic dispersing or emulsifying agent may be used as the non-ionic component of the stabilizing mixture of the present invention. Suitable agents of this class include the reaction products of fatty alcohols or fatty acids of 8–22 carbon atoms with 6–50 mols of ethylene or propylene oxide to yield compounds of the formula $$R-CH_2O(CH_2O)_nC_2H_4OH$$

or $$R-COO(CH_2CH_2O)_nC_2H_4OH$$

In addition there may be employed the condensates formed by reacting ethylene oxide or propylene oxide with a mono- or poly-carboxylic acid glycol or polyglycol esters. Thus mannitol or sorbitol may be mono esterified with a fatty acid, and the product reacted with 6–50 mols of ethylene oxide. Moreover the condensation products of aryl, alkaryl, cycloaliphatic and arylcycloaliphatic alcohols and thio-alcohols with 6–50 mols of ethylene oxide or propylene oxide to form dispersing agents may likewise be used. Such agents may have the formula

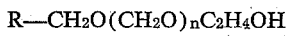
$$R-C_6H_4-O-(CH_2CH_2O)_nCH_2CH_2OH$$

or

$$R-CH_2S(CH_2CH_2O)_nCH_2CH_2OH$$

In addition the polyethyleneglycol-substituted maleic esters of the formula $$HO(CH_2O)_nCH_2OCH(COOR)CH_2COOR$$

may be used.

The anionic dispersing agents employed in the stabilizing mixture may be any agent selected from the well known group consisting of the alum-stable sulfonate and the alum-stable sulfate dispersing agents. Numerous members of this group are well known in the detergent art and are characterized in that 1/2% aqueous solutions thereof do not precipitate or flocculate at 20° C. in the presence of 500 p. p. m. of alum as $Al_2(SO_4)_3 \cdot 14H_2O$. Representative members of this group include the following:

Sodium alkylnaphthalene sulfonates condensed with formaldehyde
Sodium isopropylnaphthalene sulfonate
Sodium butylnaphthalene sulfonate
Sodium tetrahydronaphthalene sulfonate
Sodium monobutyl phenylphenol monosulfate
Sodium alkylsulfobenzoate condensed with formaldehyde
Purified sulfolignin
Sodium alkyl phenylene sulfonate
Sodium alkyl (ca. $C_{11}$) sulfonate
Sodium octyl sulfate
Sodium aryl alkyl polyether sulfonate
Sodium aryl alkyl ether sulfate
Sodium alkylbenzene mono-sulfonates
Sodium salt of N-oleyl-N-methyltaurine
Sodium salt formaldehyde condensate of benzyl naphthalene sulfonic acid
Sodium dodecyl phenyl poly (3) glycol ether sulfonate
Sodium alkylanilinesulfonate Mixtures of the two or more non-ionic despersing agents and mixtures of two or more anionic dispersing agents of the above types may also be used.

In the specification and claims the word "alum" is used to designate papermaker's alum, that is, aluminum sulfate containing about 14 mols of water of hydration. An equivalent amount of any similar aluminum salt such as aluminum chloride or a salt which yields aluminum cations may be used such as sodium aluminate.

The emulsion is then slowly poured into the stock with gentle stirring so as to distribute the emulsion into the stock as uniformly as possible. Precipitation of the dispersed bonding agent begins at once and complete flocculation or equilibrium is reached within 15 seconds to 5–10 minutes, depending principally on the amount added.

The invention will be illustrated by the following specific examples. The examples are specific embodiments of the invention, which has been disclosed above. Parts are by weight unless otherwise stated.

*Example 1*

The following series of comparative tests was made.

A 3% stock of medium-length chrysotile asbestos fibers which had been slushed for 10 minutes and beaten for 5 minutes to shorten the length of the fibers and to which had been added 20 parts per million of a silicone antifoaming compound (Dow-Corning Antifoam Compound A) was divided into aliquots.

The latex used was an aqueous emulsion of a 75% butadiene-25% acrylonitrile copolymer in the tacky stage containing 5% sodium stearate and 1% sodium rosinate on the weight of the polymer as the emulsifying agent, to which had been added 0.1% of 4,4'-methylene-bis-2-t-butyl-5,5'-phenol as antioxidant for the polymer based on the weight thereof. The latex was adjusted to 20% polymer content by the addition of water.

Aliquots of this latex were withdrawn and modified as shown in the table below:

The tests were made by slowly adding the respective aliquots of latex to the aliquots of the stock in a 1½ lb. Valley laboratory beater set for gentle circulation. In each instance the latex was added in a uniform manner, and the stock observed for agglomeration and clotting. Agglomeration was considered to take place when the fibers formed into loosely-knit bundles. Clotting was considered to take place when the bundles coalesced into large putty-like balls. Where agglomeration alone occurred, the fibers were readily liberated by circulating the stock through the beater with 13.5 lb. on the bed plate arm for about two minutes. The fibers which clotted could not be liberated as the clots were too large and compact to pass through the beater.

In each instance precipitation of the emulsion reached equilibrium within five minutes and was complete leaving a clear white water except as noted. Where a freely fibered stock was obtained the stock was sheeted at 0.5% consistency and the sheets drained with vacuum suction, pressed in three passes at uniformly increasing pressure through a Noble-Wood handsheet press, the last pass being at maximum pressure, dried for six minutes at 240° F. on a Noble-Wood handsheet drier, and calendered by two passes between the rolls of the press. The sheets were cut into strips and tested and the results averaged. Sheets were also made in the same manner omitting the use of latex.

The tests prefixed by the letter "C" are control tests.

Sheets T1–T4 were very strong, leathery to the touch, and could be creased without breaking.

These tests demonstrate that in the absence of the nonionic and modifiers in combination, application of the latex caused immediate and severe clotting of the fibers. The tests further demonstrate that extensive impregnation of the fibers takes place in the absence of alum, leading to formation of sheets of satisfactory strength, and that where flocculation of the emulsified bonding agent is incomplete, complete flocculation can be achieved by the use of alum as shown.

*Example 2*

A stock of chrysotile asbestos fiber (75% XX grade, 25% grade C) was slushed for one hour at 4% consistency in a 1½ lb. Valley laboratory beater with no weight on the bedplate arm. Aliquots of this stock diluted to 2.0% consistency were impregnated in a comparative series of tests in accordance with the general procedure of Example 1, except that the alum was added directly to the stock, followed by the emulsion. The impregnant used was a 20% latex of polyethyl acrylate in a soft, tacky stage of polymerization containing 2.67% of sodium di-1,3-dimethylbutyl sulfosuccinate based on the weight of elastomer as emulsifier. Before application the latex was modified as shown in the table. Where agglomeration took place the fibers were separated by a few minutes of beating with 13.5 lb. on the bedplate arm.

Another portion of the stock was brushed in the beater at 3.5% consistency for 35 minutes and formed into sheets in the same manner.

| Test | Brushing | Modifier in latex [1] | | Alum, percent | Latex added,[4] percent | Basis[5] wt. | Tensile, lb./in. | Remarks |
|---|---|---|---|---|---|---|---|---|
| | | Non-ionic,[2] percent | Anionic,[3] percent | | | | | |
| C-1 | None | | | | | 345 | 2.2 | No latex added. |
| C-2 | do | | | | 5 | | | Severely, irreversibly clotted. |
| C-3 | do | | 3 | | 5 | | | Do. |
| C-4 | do | 7 | | 5 | 5 | | | Do. |
| T-1 | do | 7 | 3 | | 5 | 325 | 8.8 | No agglom.; ppn. incomplete. |
| T-2 | do | 7 | 3 | 5 | 5 | 333 | 9.5 | No agglom.; ppn. complete. |
| T-3 | do | 7 | 3 | 3 | 5 | 351 | 9.6 | Do. |
| C-5 | do | | | | | 322 | 2.5 | |
| T-4 | 35 min | 7 | 3 | 5 | 5 | 369 | 14.6 | Fibers dispersed; ppn. complete. |

[1] Based on the weight of polyethyl acrylate.
[2] Cond. prod. of 10 mols of ethylene oxide with t-octylphenol.
[3] Cond. prod. of sodium alkylnaphthalene sulfonate with formaldehyde (Accocel 740).
[4] Based on the weight of asbestos fibers.
[5] Basis 25" x 40"/500.

The tests prefixed by the letter "T" illustrate the process of the present invention.

*Example 3*

Test T-3 of Example 2 was repeated using a polyethyl

| Test | Modifier in latex [1] | | | Latex added,[5] percent | Basis wt.[6] | Burst (Mullen), lb./in. | Tensile, lb./in. | Elongation, percent | Remarks |
|---|---|---|---|---|---|---|---|---|---|
| | Non-ionic,[2] percent | Anionic,[3] percent | Alum,[4] percent | | | | | | |
| C-1 | | | | | 610 | 13.5 | 1.8 | 1.0 | No latex added. |
| C-2 | | | | 5 | | | | | Fibers clotted irreversibly on addition of latex. |
| C-3 | | 3 | | 5 | | | | | Do. |
| T-1 | 7 | 3 | | 15 | | | | | No agglomeration; precipitation not quite complete. |
| T-2 | 7 | 3 | 7 5 | 30 | 617 | 158.0 | 23.3 | 7.6 | Sl. agglomeration; ppn. complete; fibers redispersed by beating. |
| T-3 | 7 | 3 | (8) | 30 | | | | | No agglomeration; ppn. incomplete until addition of alum. |
| T-4 | 7 | 3 | 10 | 50 | 712 | 203.5 | 27.8 | 9.4 | Sl. agglomeration; fibers redispersed by beating. |

[1] Based on weight of copolymer in latex.
[2] Cond. prod. of 10 mols of ethylene oxide with t-octylphenol.
[3] Cond. prod. of sodium alkylnaphthalenesulfonate with formaldehyde (Accocel 740).
[4] Papermaker's alum, iron-free.
[5] Based on dry weight of asbestos fibers.
[6] Basis 25" x 40"/500.
[7] An additional 5% of alum was added immediately after addition of the emulsion.
[8] 10% alum added after addition of latex.

In test C-1, where no impregnant was used, the stock drained slowly. In tests T1–T4 the stocks drained very rapidly.

Sheet C-1 was weak and dry, and cracked on folding.

acrylate prepared with sodium oleate as the emulsifying agent (5% based on the weight of polyethyl acrylate) and reducing the amounts of non-ionic and anionic to 4.9% and 2.1% respectively. No agglomeration was observed. A sheet of 373 basis weight was obtained which had a tensile strength of 7.9 lb. per inch.

Example 4

Four sets of thin asbestos sheets of about 0.007" caliper were prepared in general accordance with the method of Example 2, except that the alum, where used, was added directly to the slush stock and the emulsion added a few minutes thereafter; the sheets were formed with the stock at 2.5% consistency and handsheets made without the use of vacuum; the white water was substantially clear. The wet sheets were pressed between blotters and felts on a Noble-Wood handsheet press and dried on one blotter for 2 minutes at 240° F.

The stock drained well; the wet sheets were easily removed from the wire without tearing and could be handled rapidly. Where no impregnant was used, the handsheet could not be removed from the wire because of insufficient strength.

Two sets of sheets were made using the polyethylacrylate emulsion of Example 2, and two sets were made using the butadiene-acrylonitrile copolymer latex of Example 1.

No more than slight agglomeration took place on addition of the emulsions. In each instance the wet sheets were easily removed from the wire without tearing and could be handled rapidly without damage. Where no impregnant was used, the handsheets were so weak that they could not be removed from the wire without tearing.

POLYETHYL ACRYLATE EMULSION

| Test | Modifier in latex | | Alum,[4] percent | Latex added,[4] percent | Basis[5] wt. | Caliper, 0.001" | Tensile, lb./in. | Elongation, percent |
|---|---|---|---|---|---|---|---|---|
| | Nonionic,[2] percent | Anionic,[3] percent | | | | | | |
| T-1 | 7 | 3 | 5 | 5 | 93.5 | 7.2 | 3.5 | 3.8 |
| T-2 | 7 | 3 | 5 | 10 | 98.4 | 7.1 | 4.3 | 5.0 |

BUTADIENE-ACRYLONITRILE LATEX

| T-3 | 7 | 3 | 5 | 5 | 96.4 | 7.0 | 3.3 | 5.0 |
| T-4 | 7 | 3 | 5 | 10 | 103.0 | 7.3 | 2.8 | 4.4 |

[1] Based on weight of polymer in latex.
[2] Cond. prod. of 10 mols of ethylene oxide with t-octylphenol.
[3] Cond. prod. of sodium alkylnaphthalene sulfonic acid with formaldehyde (Accocel 740).
[4] Based on dry weight of fibers.
[5] Basis wt. 25" x 40"/500.

Example 5

Strong pliable low-conductivity asbestos paper suitable for electrical insulation was prepared as follows.

Chrysotile asbestos fibers were slushed with demineralized water, drained, re-slushed, and re-drained, to remove soluble cations. The stock was then slushed at 1% consistency, and to this was added commercial GR-S VI latex at 15% solids containing 15% of stabilizing mixture based on the weight of polymer solids. The stabilizing mixture consisted of 70% by weight of the condensation product of 10 mols of ethylene oxide with tertiary octyl phenol and 30% of the condensation product of sodium alkylnaphthalene sulfonate with formaldehyde (Accocel 740). The thus-treated latex was slowly stirred into the fibers in six increments, the stock being allowed to age until flocculation of each increment was complete. The weight of polymer added was 15% of the dry weight of the fibers. The stock, which did not agglomerate was then sheeted to about 0.01" caliper. The sheets were removed from the wire and dried at 240° F. for 5 minutes. The sheets were strong and sensibly elastic and could be bent double without cracking.

I claim:

1. A method for manufacturing asbestos paper of improved strength, pliability and elasticity from alkaline-reacting asbestos fibers in aqueous suspension and an anionic normally alum-unstable latex of a normally tacky bonding agent for said fibers without causing said fibers to clot, which comprises forming a stock of papermaking asbestos fibers, adding to an aqueous anionic alum-unstable latex of a tacky organic hydrophobic bonding agent sufficient of a nonionic dispersing agent and sufficient of an anionic dispersing agent selected from the group consisting of the alum-stable sulfate and alum-stable sulfonate dispersing agents to render said latex alum-stable, the weight of said added alum-stable anionic dispersing agent being between 25% and 100% of the weight of said added nonionic dispersing agent, adding said thus stabilized latex to said suspension of asbestos fibers, the weight of bonding agent in said latex being between about 5% and 50% of the dry weight of the fibers, thereby flocculating and irreversibly precipitating at least a major proportion of said bonding agent on said fibers; forming said fibers into paper, and drying said paper.

2. A method for manufacturing asbestos paper of improved strength, pliability and elasticity from alkaline-reacting asbestos fibers in aqueous suspension and an anionic normally alum-unstable latex of a tacky organic hydrophobic bonding agent for said fibers without causing said fibers to clot, which comprises forming a stock of papermaking asbestos fibers, adding to an aqueous anionic alum-unstable latex of a tacky organic hydrophobic bonding agent sufficient of a nonionic dispersing agent and sufficient of an anionic dispersing agent selected from the group consisting of the alum-stable sulfate and alum-stable sulfonate dispersing agents to render said latex alum-stable, the weight of said added alum-stable anionic dispersing agent being between 25% and 100% of the weight of said added nonionic dispersing agent and the weight of said impregnant in said dispersion being between about 5% and 50% of the weight of the fibers in said stock, adding to said latex at least ⅙ mol of alum per mol of alum-sensitive emulsifying agent therein, adding said latex to said stock and thereby flocculating and irreversibly precipitating said bonding agent on said fibers, forming said fibers into paper, and drying said paper.

3. A method for manufacturing asbestos paper of improved strength, pliability and elasticity from alkaline-reacting asbestos fibers in aqueous suspension and an anionic normally alum-unstable latex of a tacky organic hydrophobic bonding agent for said fibers without causing said fibers to clot, which comprises forming a stock of papermaking asbestos fibers, adding to an aqueous anionic alum-unstable latex of a tacky organic hydrophobic bonding agent sufficient of a nonionic dispersing agent and sufficient of an anionic dispersing agent selected from the group consisting of the alum-stable sulfate and alum-stable sulfonate dispersing agents to render said latex alum-stable, the weight of said added alum-stable anionic dispersing agent being between 25% and 100% of the weight of said added non-ionic dispersing agent and the weight of said impregnant in said dispersion being between about 5% and 50% of the weight of the fibers in said stock; adding to said stock at least 1/6 mol of alum per mol of alum-sensitive emulsifying agent in said latex; adding said latex to said stock and thereby flocculating and irreversibly precipitating said bonding agent on said fibers, forming said fibers into paper, and drying said paper.

4. A method according to claim 2 wherein the weight of the alum-stable anionic dispersing agent is about 45% of the weight of the nonionic dispersing agent.

5. A method according to claim 3 wherein the weight of the alum-stable anionic dispersing agent is about 45% of the weight of the nonionic dispersing agent.

6. A method according to claim 1 wherein during the drying the paper is heated for about 1/2 to 3 minutes at about the flowpoint of said bonding agent to develop the bonding properties thereof.

7. A method according to claim 2 wherein during the drying the paper is heated for about 1/2 to 3 minutes at about the flowpoint of said bonding agent to develop the bonding properties thereof.

8. A method according to claim 3 wherein during the drying the paper is heated for about 1/2 to 3 minutes at about the flowpoint of said bonding agent to develop the bonding properties thereof.

References Cited in the file of this patent
UNITED STATES PATENTS

| | | |
|---|---|---|
| 1,799,217 | De Cew | Apr. 7, 1931 |
| 1,907,617 | Tucker | May 9, 1933 |
| 1,907,634 | Westcott | May 9, 1933 |
| 1,956,053 | Tucker | Apr. 24, 1934 |
| 2,133,693 | Greider | Oct. 18, 1938 |
| 2,215,553 | Johnson | Sept. 24, 1940 |
| 2,338,602 | Schur | Jan. 4, 1944 |
| 2,407,376 | Maxwell | Sept. 10, 1946 |
| 2,626,213 | Novak | Jan. 20, 1953 |

OTHER REFERENCES

Miskel: Paper Trade J., June 29, 1944, pages 27–32. (Copy in Sci. Lib.)